April 1, 1924.
L. P. PROSSEN
1,489,151
DISK WHEEL STRAIGHTENER
Filed June 16, 1923
2 Sheets-Sheet 1
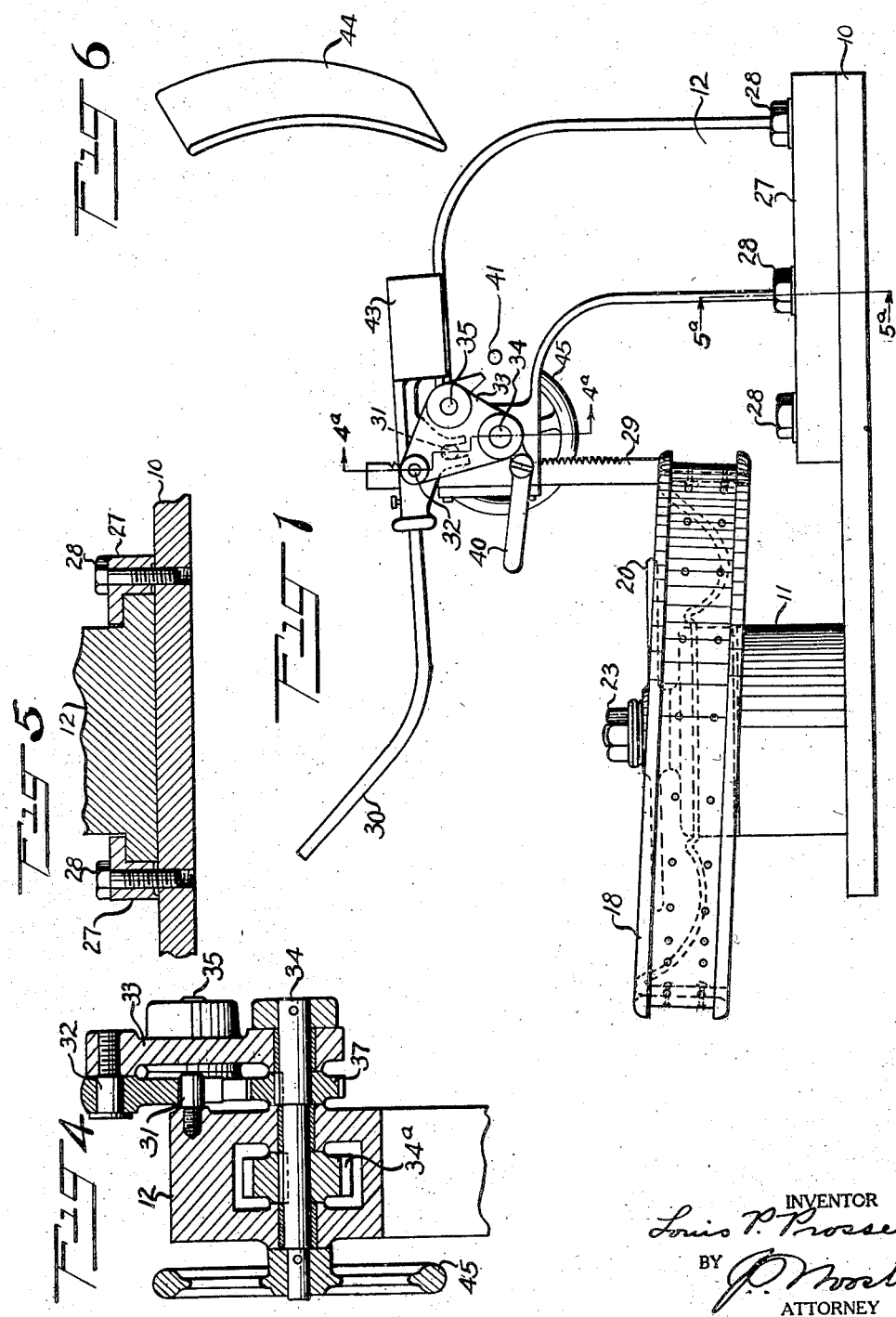
INVENTOR
Louis P. Prossen
BY
ATTORNEY April 1, 1924.
L. P. PROSSEN
DISK WHEEL STRAIGHTENER
Filed June 16, 1923
1,489,151
2 Sheets-Sheet 2
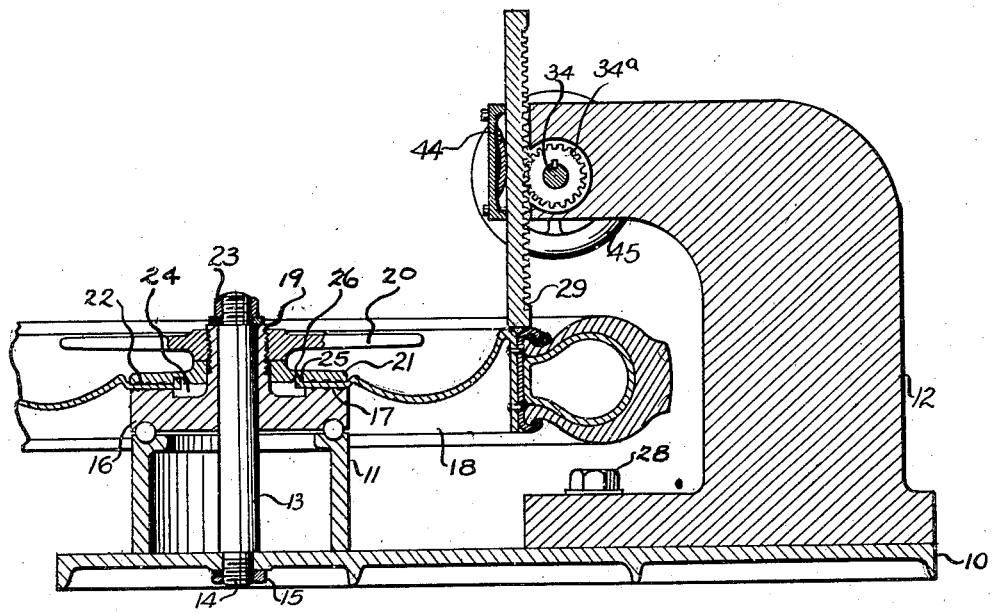
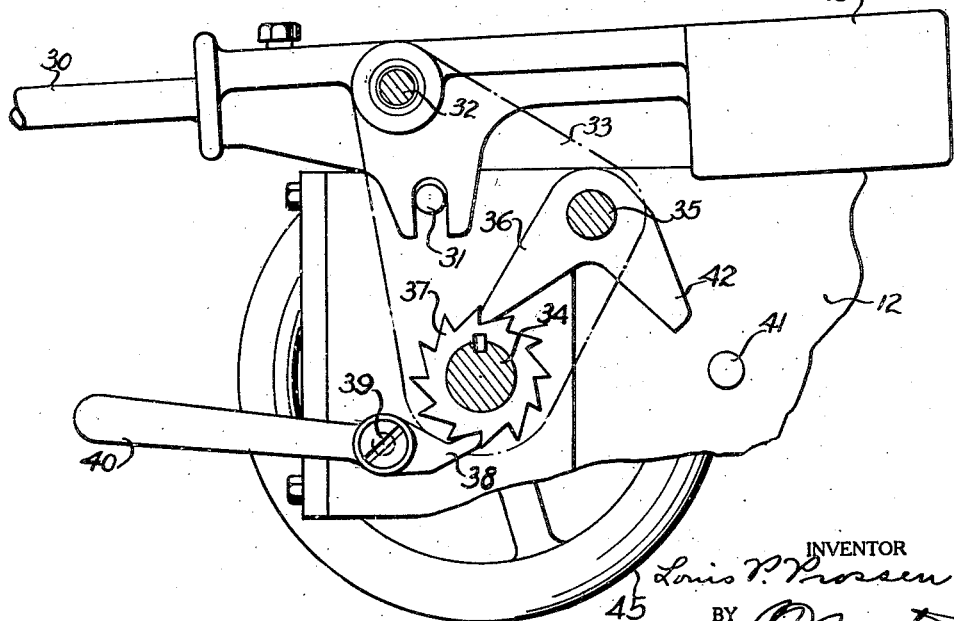

Patented Apr. 1, 1924.

1,489,151

UNITED STATES PATENT OFFICE.

LOUIS P. PROSSEN, OF CLIFFSIDE, NEW JERSEY.

DISK-WHEEL STRAIGHTENER.

Application filed June 16, 1923. Serial No. 645,721.

*To all whom it may concern:*

Be it known that I, LOUIS P. PROSSEN, a citizen of the United States, and a resident of Cliffside, in the county of Bergen and State of New Jersey, have invented certain new and useful Improvements in Disk-Wheel Straighteners, of which the following is a specification.

This invention relates to machines for bending and truing disk wheels and similar articles, and has for its object to provide a machine which is simple and convenient in operation adapted to support such wheels of different sizes and makes in substantially the same manner as they are affixed to a vehicle, and to provide means for bending either face of the disk wheel at any desired point between the hub and the periphery. Another object is to provide a press adjustably cooperating with the work-holder to accommodate wheels of different diameter and provided with means for quickly releasing the pressure while at the same time taking up the energy of rebound in the work and preventing the press member being thrown out too suddenly upon its release.

Referring to the drawings:

Figure 1 is a side view of the present invention,

Fig. 2 is a longitudinal section,

Fig. 3 is a detail of the power mechanism in the press,

Fig. 4 is a section on the line 4ª—4ª of Fig. 1,

Fig. 5 is a section on the line 5ª—5ª of Fig. 1, and

Fig. 6 is a perspective of the brake spring.

In the drawings, the base 10, of cast iron or other suitable material, has provided thereon a support 11 on which is located the clamping means for the disk wheel or other work to be operated upon, and the second support 12 containing the press for bending the work. Within the support 11 is a stationary spindle 13 secured to the base 10 in some convenient manner, such, for example, as by means of the nut 15 engaging the threaded portion 14 of the spindle. Journaled on the spindle 13 and carried on the support 11 by roller or ball bearings is the turret 16 having its work supporting surface 17 corrugated or roughened to firmly retain the work 18, which in the drawing is shown as being a disk vehicle wheel. Extending above the surface 17 is the neck portion 19 of the turret. The nut 20, has extensions to be tightened or loosened without the aid of a wrench. Between the nut 20 and the work is the clamping member 21 which fits down on and holds the work firmly on the turret, and may also have its surface 22 roughened. Turret 16 and member 21 conform to the contour of the wheel faces and form jaws for centering and clamping the central portion of the disk wheel. The nut 23 and its washer prevents the turret 16 coming off the spindle 13. Between the neck portion 19 and the work clamping surface 17 of the turret is a recessed portion 24 and the clamping member 21 is likewise provided with a similar recessed portion 26, either of which is adapted to receive and center the customary inner flange 25 on the disk wheel. These wheels usually have their inner opening of the same diameter, but to take care of a wheel having its inner flange 25 located in a different position from standard practice, adapters may be used which comprise clamping members 21 having their recessed portions 26 of different diameters from standard practice. Either one or two of these adapters may be used, in place of members 16 or 21.

The support 12 is adjustably secured to the base 10 by means of the guideways 27 clamped to the base by bolts 28 and adapted to fit over the flange at the bottom of the support 12, constituting adjusting means for varying the distance between the clamping means and the pressing means so as to apply pressure localized at the desired point to true a disk wheel. Within the support 12 is the press 29 adapted to be forced down upon the wheel and bend the same the desired amount. A lever 30 of the desired length pivoted at 31 to the support 12 is provided for actuating the press member. Journaled to the lever at 32 is the connecting member 33 also journaled to the shaft 34 and carrying the pawl 36 pivoted thereto at 35. Keyed, or otherwise secured to the shaft 34 is the ratchet wheel 37 adapted to be rotated by engagement with the pawl 36 as the lever 30 is pulled down. The pawl 38, pivoted at 39, also engages the ratchet 37 to prevent the shaft 34 reversing when the pawl 36 is out of engagement. The handle 40 on the pawl 38 serves as a counterweight to retain the same engaged with ratchet 37 and also affords a convenient means for unlatching the pawl and releasing the pressure on the press 29. A shaft 34 also carries a gear 34ª keyed or otherwise secured thereto which engages the teeth on the press 29. A pin 41 affixed to the support 12 cooperates with the surface 42 to disengage the pawl 36 and prevent its engagement with the ratchet 37 as long as the lever 30 is in raised position. A counterweight 43 normally moves the lever 30 to its raised position with the pin 41 engaging and holding the pawl 36 out of cooperation. As the pin disengages the surface 42 the weight of the pawl 36 causes its cooperation with the ratchet 37 in the manner indicated in Fig. 3. A spring 44 of the shape indicated in Fig. 6 is flexed and cooperates with the support 12 and the press 29 at all times, whereby the friction of the spring on said press prevents rebound of the work causing the press 29 to be thrown upwardly out of support 12. The hand wheel 45 on the shaft 34 is another element which, by reason of its inertia, takes up the force of rebound in the work and helps to prevent the press being thrown out.

In operation the wheel is clamped on the turret in the manner indicated in Fig. 2. If the high spot is not readily ascertainable the press may be moved down by disengaging the pawl 38 and controlling the movement of the press by the hand wheel 45 when by rotation, the wheel 18 under this member will disclose the precise location of the distorted part. With the pawl 38 still disengaged the press may be brought down on top of this distorted part and the pawl allowed to re-engage the ratchet 37, after which downward movement of the lever 30 rotates the shaft 34 in a counter-clockwise direction in Fig. 3 and forces down the press under great pressure as far as may be desired. The wheel 18 is usually of resilient material and after distortion will be found to possess enough energy of rebound to throw the press 29 out of the support unless some preventive means be effective after the pressure has been released from the press 29 by the operator raising the handle 40 to disengage the pawl 38. Both the spring 44 and the wheel 45 contribute to take up the energy of rebound. The wheel may then be turned until the next high spot is located and corrected. In event that the wheel be bent too much at one place the clamping member 21 may be removed and the wheel turned over to expose its opposite face to the action of the press 29. A few trials will suffice to correct the distortion, enabling the wheel to be replaced on the vehicle without further difficulty. As shown in Fig. 2 of the drawing, the tire may be left on the wheel during bending if desired. The bending moment is greatest adjacent the center of the wheel and with the wheel clamped as illustrated in substantially the same manner in which it is affixed to the vehicle hub the bending is prevented from occurring in the inner portion of the wheel where it is bolted to the hub. If the clamping member 21 and turret 16 be made of larger diameter it will be apparent that the location of the bend may be controlled in this manner. Of course, if the clamping member and bolt be of much greater diameter they should be shaped to the configuration of the wheel. Ordinarily the press is located adjacent the rim but it may be also effectively moved inwardly for applying pressure localized at the desired point to true the disk or for removing dents, especially if the wheel is supported below, and if the press be free of any sharp corners which might form additional dents. Though the drawing illustrates the turret and clamping member as being provided with roughened surfaces, it will be understood that copper shims, or other padding may be used to prevent scratching the paint on the wheel, when desired.

Among the advantages of this invention may be mentioned its simplicity of construction and operation and adaptability to fit wheels of different sizes and makes. The ball bearing mounting causes little friction and the wheel when clamped, as indicated in Fig. 2, is supported in a substantially similar manner to the way in which it is carried when affixed to a vehicle. The roughened surfaces 17 and 22 grip the work and are helpful to prevent the dirt or grit causing the wheel to be improperly mounted. The spring 44 and the wheel 45 are both effective to consume the energy of rebound from the wheel after the force on press 29 has been released. The width of the turret and clamping member may control the location of bending and cause the bending to take place in whatever portion of the wheel it is desired to have it occur, although usually the distortion is slight and it is immaterial where the bend takes place so long as the wheel is trued and the bend does not occur in the central portion of the wheel, which is bolted to the hub.

Another advantage of this machine is the facility with which a disk wheel carrying a rim and tire can be readily unbolted from the hub and straightened, and then put back on the hub so that it is unnecessary to run the disk wheel out of true or cause any excessive wear on tires.

From the foregoing description it will appear that a vehicle wheel is generally required to be bent through and beyond its true plane, that is its median or radial plane in order to have a permanent set in its trued position.

I claim:

1. In a wheel straightening device, the combination with means for clamping the central portion of the faces of a disc vehicle wheel, of means for truing said wheel comprising a pressing tool movable in a direction substantially normal to the wheel plane, engaging the wheel outside the central clamped portion, and bending the same about said portion through and beyond its true plane, said clamping means and pressing tool being relatively adjustable toward and from each other.

2. In a straightening device for a disk wheel having an inner flange, the combination with means shaped to clamp opposite faces of a disk vehicle wheel at the central portion thereof, and recessed to receive the inner disk flange, of an overhanging arm carrying a press reciprocable transversely of the wheel plane for truing said wheel.

3. In a straightening device for a disk wheel having an inner flange, the combination with means shaped to clamp opposite faces of a disk vehicle wheel at the central portion thereof and recessed to receive the inner disk flange, of an overhanging arm adjustable toward and from said clamping means, carrying a press reciprocable transversely of the wheel plane for truing the wheel.

4. In a wheel straightening device, the combination with means for clamping the central portion of the faces of a disk vehicle wheel, of reciprocable pressing means movable toward and from the wheel for truing the same, and means for braking the return stroke of said pressing means.

5. In a wheel straightening device, the combination with rotatable means for clamping the central portion of the faces of a disk vehicle wheel, of pressing means movable in a direction normal to the disk surface for applying pressure between the clamped portion and the periphery at the desired point to true the disk, and means for braking the return stroke of said pressing means.

6. The combination with a work-holder adapted to support a wheel to be trued, of a press for bending the wheel, means for forcing the press against the wheel, means for releasing the press, and means for controlling rebound of the wheel upon release of the press.

7. The combination with a rotary work-holder adapted to center and clamp therein a wheel to be trued, of a press for bending the wheel, means for releasing the press, and a brake device controlling rebound of said press from said wheel upon release of the former.

8. In a device for truing a wheel, the combination with a turret on which a side of the wheel is rotatably clamped, of a clamping member engaging the opposite side of said wheel, a press adapted to cooperate with the outer portion of the wheel, means for releasing the press, and means for frictionally controlling rebound of the wheel and press.

9. In a device for truing a wheel, the combination with a turret on which a side of the wheel is rotatably clamped, of a clamping member engaging the opposite side of said wheel, a press adapted to cooperate with the outer portion of the wheel, means for releasing the press, and a rotatable member whose inertia is adapted to control rebound of said press from the wheel.

10. The combination with a turret on which a disk wheel is adapted to be carried, of a member cooperating with the side of said wheel for clamping the same to the turret, the turret and clamping member each being provided with a recessed portion to receive the customary flange on a disk wheel whereby the same may be centered and either face of said wheel may cooperate with the turret, and a press to one side of said turret for bending the wheel carried thereon.

11. A rotatable work support adapted to center a wheel to be trued and comprising a stationary spindle, a stationary support surrounding said spindle, a turret journaled on said spindle and support, roller bearings between said turret and support, said turret having a surface on which the work may be clamped, a neck portion of said turret extending beyond said surface and along said spindle, a recessed portion between the neck and said surface, a member adapted to clamp the work on said surface provided with a retaining means in cooperation with said neck portion for securely holding the work.

12. The combination with a support, of a press movable within said support, an operating lever, transmission mechanism connecting said lever and press for forcing the latter against the work, means for releasing the press in any position thereof, and a spring frictionally engaging said press and support and adapted to control rebound of said press upon the release thereof.

Signed at New York city in the county of New York and State of New York this 14th day of June, A. D. 1923.

LOUIS P. PROSSEN.